No. 806,088. PATENTED NOV. 28, 1905.
J. C. WANDS.
JACK FOR RELIEVING PRESSURE ON PNEUMATIC TIRES OF MOTOR VEHICLES
APPLICATION FILED MAY 18, 1905
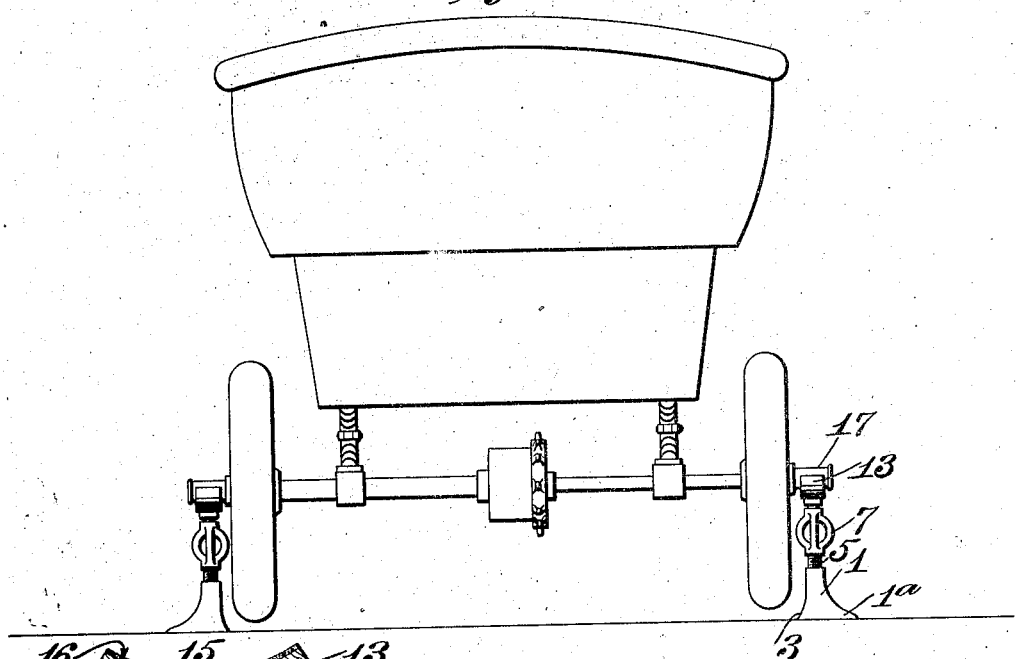
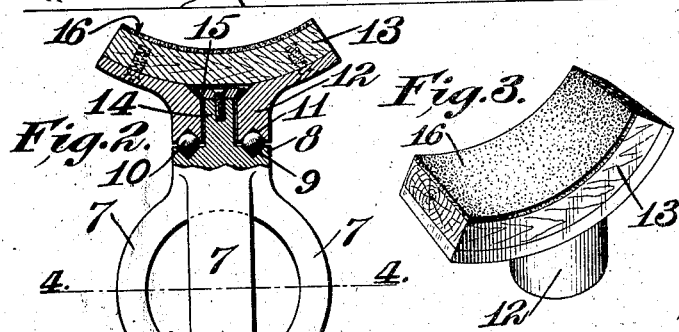
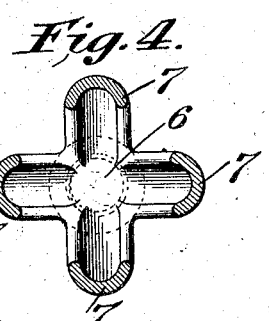
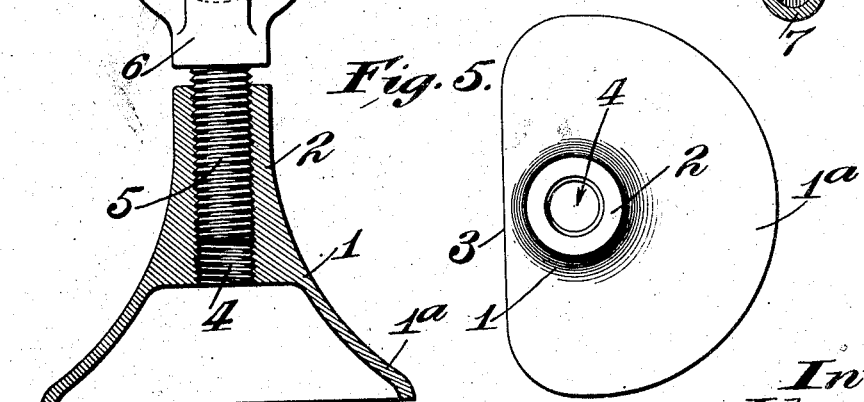
Witnesses:
G. A. Pennington
Inventor:
John C. Wands,
by Newell & Cornwall
Attys

UNITED STATES PATENT OFFICE.

JOHN C. WANDS, OF ST. LOUIS, MISSOURI.

JACK FOR RELIEVING PRESSURE ON PNEUMATIC TIRES OF MOTOR-VEHICLES.

No. 806,088.  Specification of Letters Patent.  Patented Nov. 28, 1905.

Application filed May 18, 1905. Serial No. 260,995.

*To all whom it may concern:*

Be it known that I, JOHN C. WANDS, a citizen of the United States, residing at St. Louis, Missouri, have invented a certain new and useful Improvement in Jacks for Relieving Pressure on Pneumatic Tires of Motor-Vehicles, of which the following is a full, clear, and exact description, such as will enable others skilled in the art to which it appertains to make and use the same, reference being had to the accompanying drawings, forming part of this specification, in which—

Figure 1 is a rear view of a motor-vehicle, showing my invention applied. Fig. 2 is a sectional view through a jack constructed in accordance with my invention. Fig. 3 is a perspective view of the hub-engaging jaw. Fig. 4 is a cross-sectional view on the line 4 4 of Fig. 2, and Fig. 5 is a top plan view of the base.

This invention relates to a jack for the purpose of receiving the weight of a motor-vehicle, particularly when it is in the shed or salesroom; and the object of the invention is to provide means whereby the weight of the vehicle-body, the drive-gears, and other accessories on the tire will be relieved when the motor-vehicle is not in use.

Inasmuch as all motor-vehicles are equipped with pneumatic tires and as these tires are liable to set at the tread portions, on which they rest when not in use, the liability of deterioration of the tire on account of the weight of the vehicle is a material factor in the life thereof. It is recognized in this art that the wear on the tire due to this so-called "setting" is nearly, if not wholly, as great as the wear and tear caused by the travel of the tire over the road. It is contemplated to reduce the liability of the wear of the tire by maintaining it above its support. I accomplish this through the medium of a novel form of jack illustrated in Figs. 2 to 5 of the drawings, in which 1 designates a base having a bottom flange 1ª eccentric to an upstanding standard portion 2. One side of the base-flange 1ª is straight, as at 3, so that the base may be introduced close to the wheel. The portion 2 is provided with an internal thread, as at 4, to receive a threaded shank 5 on a rotatable operating member 6, which operating member is provided with a plurality of curved handholds 7, comprising an approximately spherical portion, at the top of which is a shoulder 8, having a raceway 9 for the reception of antifriction devices 10, which antifriction devices also engage a raceway 11 in the sleeved portion 12 of the arcuate hub-engaging jaw 13. This jaw is held in position by means of a constricted portion 14 on the operating member 6, which constricted portion is in the sleeve 12 and is provided at its end with a flared portion or enlargement 15, working in a corresponding recess in the sleeve, so that said jaw may not become accidentally displaced. The jaw 13 is preferably faced with some suitable soft material, (indicated at 16,) so as not to mar the paint or enamel on the hub of the wheel. As most motor-vehicle wheels are provided with outwardly-projecting elongated hubs, as at 17, the jaw may be caused to engage the outer portion of the hub of each back wheel, and the jack may be moved close to the wheel on account of the peculiar shape of the base-flange, as heretofore described. Ordinarily four jacks will be utilized for each motor-vehicle, and each jack will be moved close to the wheel. By turning the operating device 6 through the medium of the handholds 7, through which a suitable bar may be inserted, if desired, the rear of the wheel may be jacked up a sufficient distance to relieve all pressure on the tires. When it is desired to use the motor-vehicle, the operating device may be turned, so as to permit the tires to rest upon the floor or ground, so that the jacks may be removed.

One of the particularly novel features of this invention resides in the fact that it may be applied to the outside of the wheel without interfering with any of the mechanism and in such a manner that it will be readily accessible for application and removal. In view of the fact that the jaw is rotatable it will be apparent that said jaw will readily conform to the hub for the desired purpose.

Having thus described the invention, what is claimed as new, and desired to be secured by Letters Patent, is—

1. The combination with a lifting-jack base having a flange provided with a straight side and a curved portion, of an upstanding tubular threaded portion integral therewith, a threaded shank in the threaded tubular portion, outwardly-curved handholds carried by the shank, integral shouldered jaw-engaging portions above the handholds, and an arcuate jaw rotatably carried thereby; substantially as described.

2. In a lifting-jack for vehicles, the combination with a base, the contour of which is approximately semicircular, an upstanding tubular portion carried by the base and having threads, an arcuate jaw for engaging the hub of the vehicle, and an operating device for said jaw comprising a shank engaging the threaded portion on the base, handholds 7 carried by the shank, and a constricted portion engaging a recess in the jaw; substantially as described.

In testimony whereof I hereunto affix my signature, in the presence of two witnesses, this 15th day of May, 1905.

JOHN C. WANDS.

Witnesses:
B. F. FUNK,
GEORGE BAKEWELL.